United States Patent
Yamauchi

(10) Patent No.: US 7,060,946 B1
(45) Date of Patent: Jun. 13, 2006

(54) ANALYTICAL DEVICE WITH TEMPERATURE CONTROL SYSTEM

(75) Inventor: Kazuo Yamauchi, Ibaraki (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 10/994,346

(22) Filed: Nov. 23, 2004

(51) Int. Cl.
*H05B 1/02* (2006.01)

(52) U.S. Cl. .................... 219/492; 219/497

(58) Field of Classification Search ........ 219/412–414, 219/483–486, 492, 497, 501, 506, 494; 392/416
See application file for complete search history.

(56) References Cited

U.S. PATENT DOCUMENTS

| | | | | |
|---|---|---|---|---|
| 5,875,416 A | * | 2/1999 | Kanno | 702/130 |
| 6,911,628 B1 | * | 6/2005 | Hirayama | 219/486 |
| 6,951,998 B1 | * | 10/2005 | Nanno et al. | 219/494 |

FOREIGN PATENT DOCUMENTS

JP 200417055 A * 6/2004

* cited by examiner

*Primary Examiner*—Tu Hoang
(74) *Attorney, Agent, or Firm*—Manabu Kanesaka

(57) ABSTRACT

An analytical device includes a heat output portion for heating an interior of a housing with which an analyzing portion is surrounded; a first temperature sensor for measuring a temperature of the analyzing portion; a second temperature sensor for measuring a temperature of an interior of the housing; and a control portion. The control portion determines a setting value of the temperature in the housing according to a transfer function of a PID control based on a difference between a preset temperature of the analyzing portion and the temperature measured by the first temperature sensor. Further, the control portion determines an output value of the heat output portion according to a transfer function of PID control based on a difference between the setting value of the temperature in the housing and the temperature measured by the second temperature sensor.

4 Claims, 5 Drawing Sheets

Fig. 4

|       | Proportional gain Kp | Integration time Ti | Derivative action time Td | Offset Mφ |
|-------|----------------------|---------------------|---------------------------|-----------|
| PID-C1 | 0.06 | 7.68 | 10.0 | 15% |
| PID-C2 | 0.08 | 4.10 | 5.0 | 15% |

ANALYTICAL DEVICE WITH TEMPERATURE CONTROL SYSTEM

BACKGROUND OF THE INVENTION AND RELATED ART STATEMENT

The invention relates to an analytical device, such as a mass spectrometer, gas chromatograph and liquid chromatograph in which accurate temperature control is required for analysis.

In a Time of Flight (TOF) type mass spectrometer, after a sample is ionized, a voltage is applied to accelerate the ion. The ion flies in a flight tube held in a high vacuum and reaches an electrode. A time of flight of the ion is measured to determine a mass (mass/charge) of the ion. When the flight tube is expanded or contracted due to a temperature change, a flight length of the ion is changed, thereby causing an error in the measured mass number. In a quadrupole type mass spectrometer, when a quadrupole rod is expanded or contracted due to a temperature change, a quadrupole electric field in a space surrounded by the quadrupole rod is changed, thereby changing transporting efficiency of the ion and causing an error in the measured ion intensity. In a gas chromatograph, an analysis is carried out based on a difference in a boiling point of a sample. Therefore, when the temperature is not controlled accurately, it is difficult to analyze with good repeatability.

A PID control has been known as a method of controlling a physical quantity with high accuracy (refer to Patent Document 1 and Non-Patent Document 1). In the PID control for controlling a temperature as an example, an output of a heater (or cooler) is a sum of a term (proportional term: P term) in proportion to an error or difference between a present temperature of a subject to be controlled and a preset temperature; a term (integral term: I term) in proportion to an integral of the error; and a term (derivative term: D term) in proportion to a derivative of the error. Incidentally, when such a sum is employed, each term is often modified with a predetermined weight.

When the monitored temperature of the subject to be controlled is Tmon, the preset temperature is Tset, the error is E, and the output of the heater is M, a block diagram of the temperature control through the PID control is expressed as shown in FIG. 1. In FIG. 1, symbol C represents a transfer function of the PID control, and symbol G represents a transfer function of a system of the subject to be controlled. As shown in FIG. 1, when the monitored temperature Tmon is changed due to an external disturbance, the output M of the heater according to the error E between the monitored temperature Tmon and the preset temperature Tset is controlled.

In order to improve the accuracy of the PID control, there has been known a cascade control wherein the PID control is applied in double. In the cascade control, a single control system signal provides a preset value of another control system, so that a loop of the PID feedback works in double (in cascade).

[Patent Document 1]
Japanese Patent Publication (Kokai) No. 2001-357816

[Non-Patent Document 1]
"BASIC AND APPLICATION OF PID CONTROL" Shigehiko Yamamoto and Naotake Katoh, Asakura Shoten (publisher), Apr. 1, 1997

As described above, the PID control and the cascade PID control are suitable for controlling a physical quantity with high precision. When a temperature is controlled, if a system of a subject to be controlled (subject to temperature control) has large thermal capacity, the system has a large time constant, and a waste time (from start of the control to when a monitored value changes) becomes large. Accordingly, it is difficult to adjust a coefficient or parameter of the PID control. In the analytical device requiring accurate temperature control as described above, it is more difficult to control the temperature. In particular, when the temperature control is started, an overshoot or an excessive long control time may occur. Also, it is difficult to control against an external disturbance such as a rapid change in an outside temperature.

In view of the above problems, the present invention has been made, and an object of the invention is to provide an analytical device with a temperature control device capable of controlling a temperature with high accuracy.

Further objects and advantages of the invention will be apparent from the following description of the invention.

SUMMARY OF THE INVENTION

In order to attain the objects described above, according to the present invention, an analytical device includes a heat output portion for heating an interior of a housing with which an analyzing portion is surrounded; a first temperature sensor for measuring a temperature of the analyzing portion; a second temperature sensor for measuring a temperature of an interior of the housing; and a control portion for controlling such that a set value of the temperature in the housing is determined according to a transfer function of a PID control based on an error or difference between a preset temperature of the analyzing portion and the temperature measured by the first temperature sensor, and an output value of the heat output portion is determined according to a transfer function of a PID control from a difference between the setting temperature of an interior of the housing and the temperature measured by the second temperature sensor.

BRIEF DESCRIPTION OF THE DRAWINGS

FIG. 4 is a table showing values of a PID parameter set obtained through try-and-error method;

DETAILED DESCRIPTION OF A PREFERRED EMBODIMENT

Figure 1:
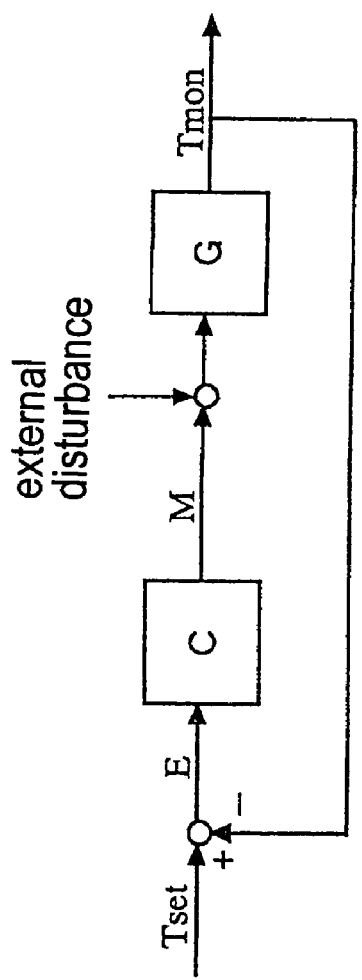
FIG. 1 is a block diagram showing a case wherein a temperature is controlled through a single PID control.
Figure 2:
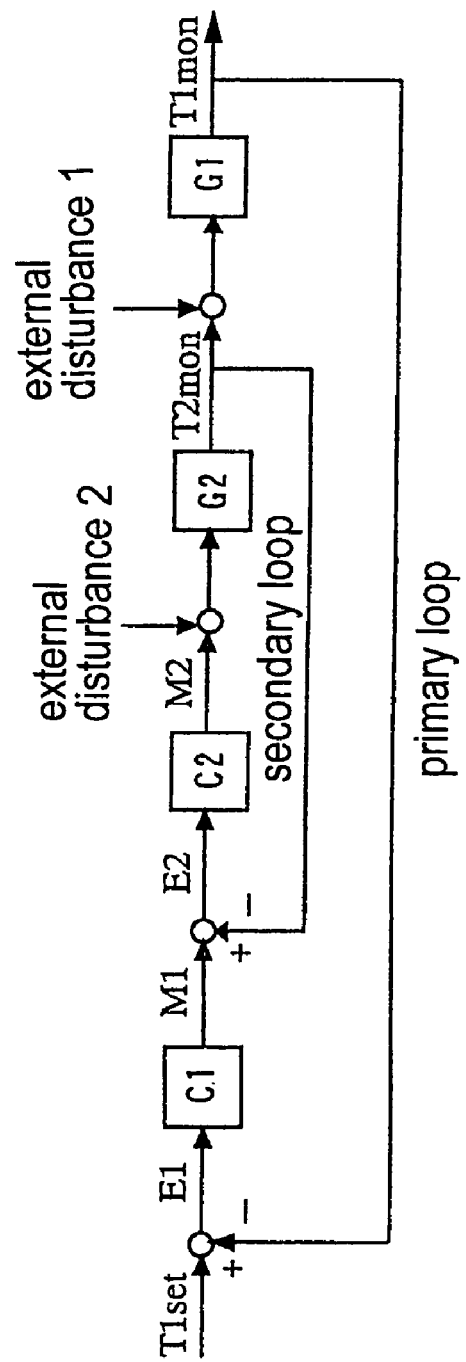
FIG. 2 is a block diagram showing a case wherein a temperature is controlled through a cascade PID control.

Hereunder, embodiments of the present invention will be explained with reference to the accompanying drawings. A control portion of an analytical device according to the present invention carries out a cascade PID control shown in FIG. 2. In FIG. 2, symbol T1set represents a preset value of a temperature at an analyzing portion; symbol T1mon represents a monitored value of a temperature at the analyzing portion measured by a first temperature sensor; symbol M1 represents a preset temperature value of the interior of the housing; symbol T2mon represents a monitored value of a temperature in the housing measured by the second temperature sensor; and symbol M2 represents a control input value to a heat output portion for heating the interior of the housing (for example, current supplied to the heater).

Further, symbol C1 is a transfer function (hereinafter referred to as PID-C1) of a PID control of the temperature of the analyzing portion; symbol C2 is a transfer function (hereinafter referred to as PID-C2) of a PID control of the temperature in the housing; and G1 and G2 are transfer functions representing the temperature control process of the analyzing portion and the temperature control process in the housing, respectively.

The respective control processes are expressed as formulae (1) to (4) based on a time delay and a first order lag. The transfer function of a secondary loop is expressed as formula (5). Incidentally, a primary loop is a series of controlling loops wherein the temperature control is carried out based on an error or difference E1 between the monitored value T1mon and the preset value T1set of the temperature in the analyzing portion. The secondary loop is a series of controlling loops wherein the temperature control is carried out based on an error or difference E2 between the monitored value T2mon and the preset temperature value M1 of the interior of the housing.

$$C_1(S) = K_{1p}\left(1 + \frac{1}{T_{1iS}} + T_{1dS}\right) \quad (1)$$

$$C_2(S) = K_{2p}\left(1 + \frac{1}{T_{2iS}} + T_{2dS}\right) \quad (2)$$

$$G_1(S) = \frac{k_1 e^{-L1S}}{1 + \tau_{1S}} \quad (3)$$

$$G_2(S) = \frac{k_2 e^{-L2S}}{1 + \tau_{2S}} \quad (4)$$

$$G_3(S) = \frac{C_2(S)G_2(S)}{1 + C_2(S)G_2(S)} \quad (5)$$
$$= \frac{k_2 e^{-L2S}(T_{2iS} + T_{2iS}T_{2dS} + 1)}{\frac{(1+\tau_{2S})T_{2iS}}{K_{2p}} + k_2 e^{-L2S}(T_{2iS} + T_{2iS}T_{2dS} + 1)}$$

According to the invention, in the temperature control system of the analytical device, the preset value T1set of the temperature of the analyzing portion is directly set from outside. The preset temperature value M1 of the housing is determined from the error E1 between the preset value T1set of the temperature at the analyzing portion and the monitored value T1mon according to the transfer function PID-C1 of the PID control of the primary loop. The preset temperature value M1 inside the housing is provided to the PID control of the secondary loop. The control output M2 is determined according to the transfer function PID-C2 of the PID control of the secondary loop from the error E2 between the preset value M1 and the monitored value T2mon of the temperature in the housing. The heat output portion is controlled based on the control output M2.

A system for introducing hot air from outside may be provided in the heat output portion as a specific device for carrying out the cascade PID control, in addition to a combination of a heater and a fan disposed inside the housing surrounding the analyzing portion. In this case, the control output can be controlled by adjusting the temperature and flow of the air.

While the temperature control system according to the present invention is applicable to various analytical devices, the temperature control system is especially suitable for a time of flight (TOF) type mass spectrometer wherein a temperature change in an analyzing portion has a great influence on an analyzed result.

In the present invention, the temperature inside the housing is used for the cascade control with respect to the temperature control of the analyzing portion. Accordingly, it is possible to stably control the temperature with high accuracy against an external disturbance and the like. As a result, the analytical device of the present invention can perform analysis with high accuracy.

In the invention, the temperature inside the housing is controlled. Accordingly, when a portion (for example, an electric circuit board to be controlled or the like) other than the analyzing portion, i.e. a main portion to be controlled in the housing, is disposed in the housing, it is possible to control the temperature of the portion (additional portion). Even if the additional portion dissipates or absorbs heat, an external disturbance due to the heat is properly controlled in the secondary loop, thereby minimizing an influence on the analyzing portion.

Also, the temperature in the vicinity of the heater can be precisely regulated within an operational range of the PID control of the secondary loop. Accordingly, it is possible to improve safety as compared with a conventional PID control wherein it is difficult to set an output range of a heater to regulate a safe temperature.

Figure 3:
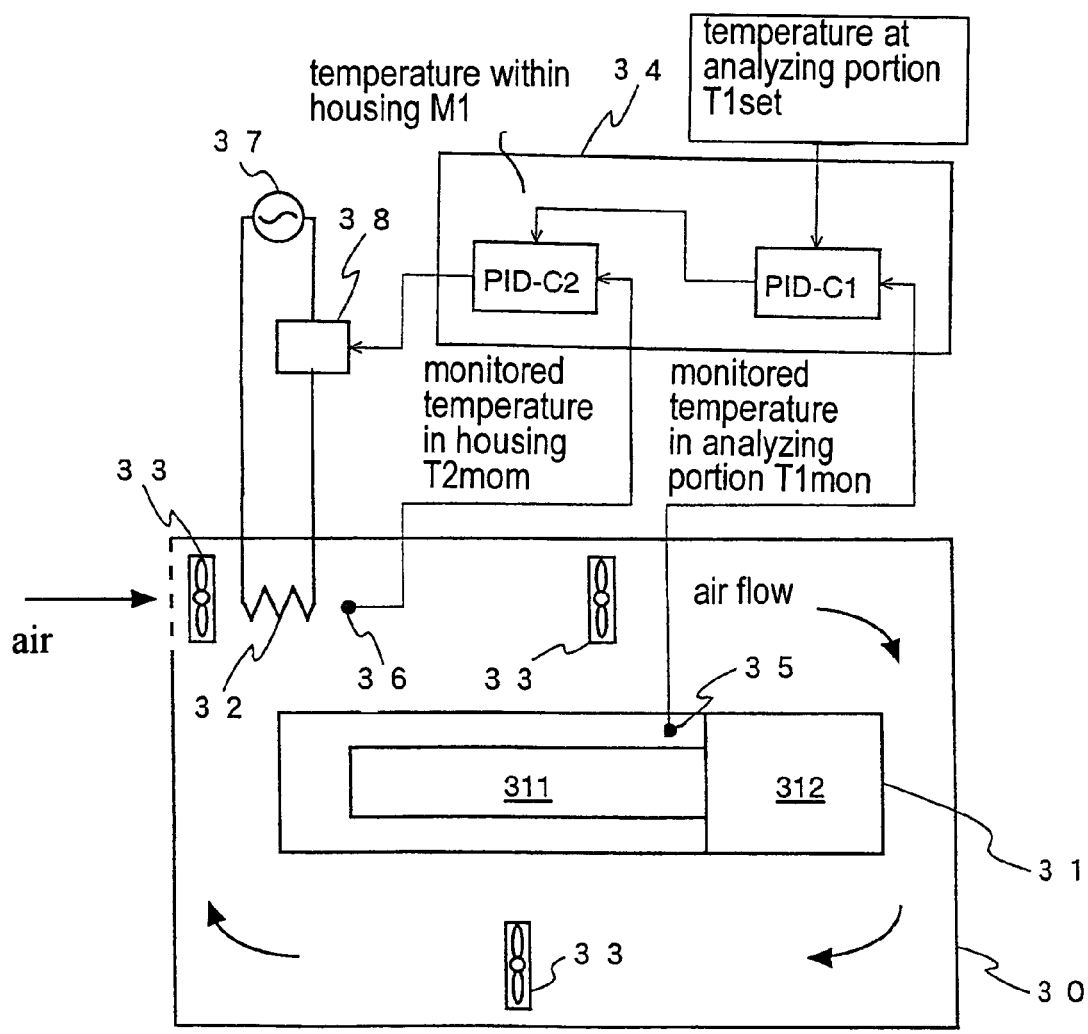
FIG. 3 is a block diagram showing a temperature control system of a TOF type mass spectrometer using the cascade PID control.

FIG. 3 shows a structure of the temperature control system of the TOF type mass spectrometer according to an embodiment of the present invention. The mass spectrometer includes: a housing 30 formed of insulated walls; a mass analyzing portion 31 disposed in the housing 30; a heater 32 disposed in the housing 30 at a position apart from the mass analyzing portion 31; three fans 33 disposed at suitable positions; a control portion 34 disposed outside the housing 30; and the like. Incidentally, the number and positions of the fans shown in FIG. 3 are only an example, and may be suitably determined according to desired control precision.

An analyzing portion temperature sensor 35 is provided in the mass analyzing portion 31, and an ambient temperature sensor 36 is disposed near the heater 32. Specifically, while the mass analyzing portion 31 is formed of a flight tube 311 and an ion trap 312, it is desirable that the analyzing portion temperature sensor 35 be disposed on a side of the flight tube 311 requiring a high temperature control.

A control portion 34 is formed of a microcomputer and a control program for actuating the same. As shown in FIG. 3, the control portion 34 functionally includes a first control portion to be operated according to the PID control transfer function PID-C1 of the primary loop, and a second control portion to be operated according to the PID control transfer function PID-C2 of the secondary loop. A control target temperature (preset temperature) of the mass analyzing portion is set through a keyboard input or the like, and is sent to the first control portion PID-C1. The heater 32 is connected to a power supply 37 and a current control portion 38.

The control portion 34 performs the cascade PID control of the primary loop at the first control portion PID-C1 and the cascade PID control of the secondary loop at the second control portion PID-C2. Due to the two PID control loops, it is necessary to adjust two sets of PID control parameters (PID parameters) including a proportional gain Kp, an integration time Ti, and a derivative action time Td, i.e. total six parameters. Methods of tuning the PID parameters include an automatic method using stepwise responding method, and a manual method using try-and-error method. The tuning method using the try-and-error method is carried out relatively easily, and is shown as follows:

(1) Td is fixed to 0.

(2) While changing Kp and Ti gradually, a response curve is observed after the temperature control is started (about 30 minutes), and iteration is carried out so that a quick response and a secure attenuation are obtained.

(3) While observing the response curve, Td is optimized with respect to the set of Kp and Ti obtained at (2).

The steps (1) to (3) are first carried out for the secondary loop parameter. Then, the cascade control is carried out using the obtained secondary loop parameter, and the primary loop parameter is obtained in the steps (1) to (3).

An offset value MΦ of the control output is set to 0 in the tuning operation. Each time when the temperature becomes equilibrium in the temperature control during the tuning operation, a PID output value (0–100%) is recorded, and the value is used as MΦ for the temperature control after the tuning operation. In the present embodiment, the PID output values of the primary loop and the secondary loop are set at MΦ=15%, respectively.

An example of the parameter set obtained through the tuning operation is shown in FIG. 4. In the example, the tuning operation was carried out in an atmosphere wherein a room temperature was 23° C. With the structure described above, the target temperature T1set of the mass analyzing portion 31 was set at 40° C., and the temperature change in the housing 30 was measured when the temperature control was actually carried out.

Figure 5:
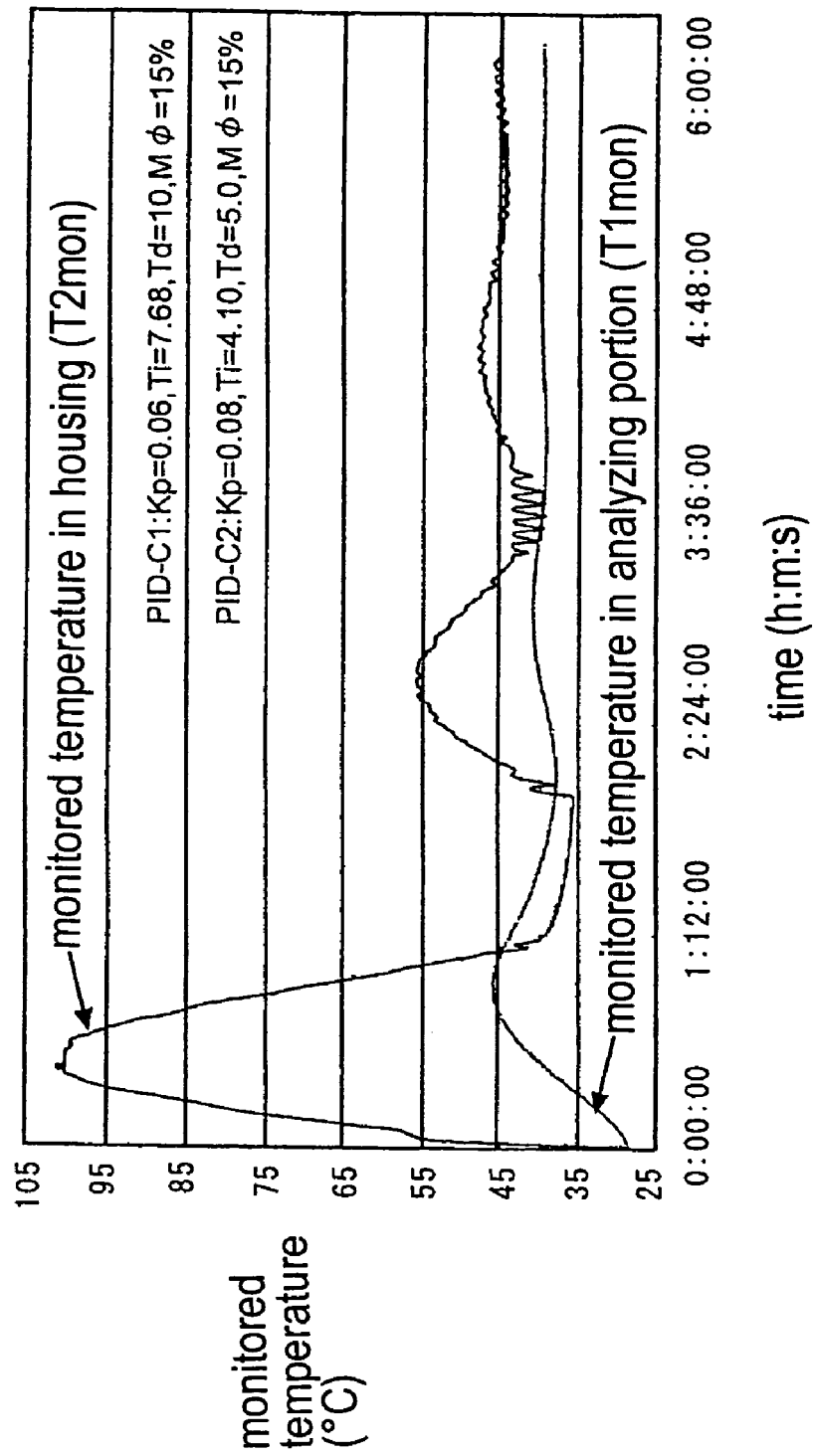
FIG. 5 is a graph showing a temperature history of a temperature inside a housing until the temperature becomes equilibrium after a device temperature control is started.

After the temperature control was started, the temperature monitored value T2mon inside the housing increased significantly, and the analyzing portion temperature T1mon was quickly elevated. However, the maximum value exceeded just slightly the target value 40° C. without a large overshoot. While the temperature monitored value T2mon inside the housing changed greatly thereafter, the analyzing portion temperature T1mon changed gently and is getting close to the target temperature 40° C. After about 7 hours, the temperature T2mon inside the housing reached equilibrium, and the analyzing portion temperature T1mon was also stabilized at the target temperature 40° C. (refer to FIG. 5). In FIG. 5, the temperature monitored value T2mon inside the housing showed a hunch in the vicinity of 43° C. This is caused due to characteristic of the heater output control device (current control portion) 38 used in the present embodiment. Because of the cascade control according to the present invention, the temperature fluctuation did not influence the stability of the temperature of the analyzing portion 31 (refer to FIG. 6).

Figure 6:
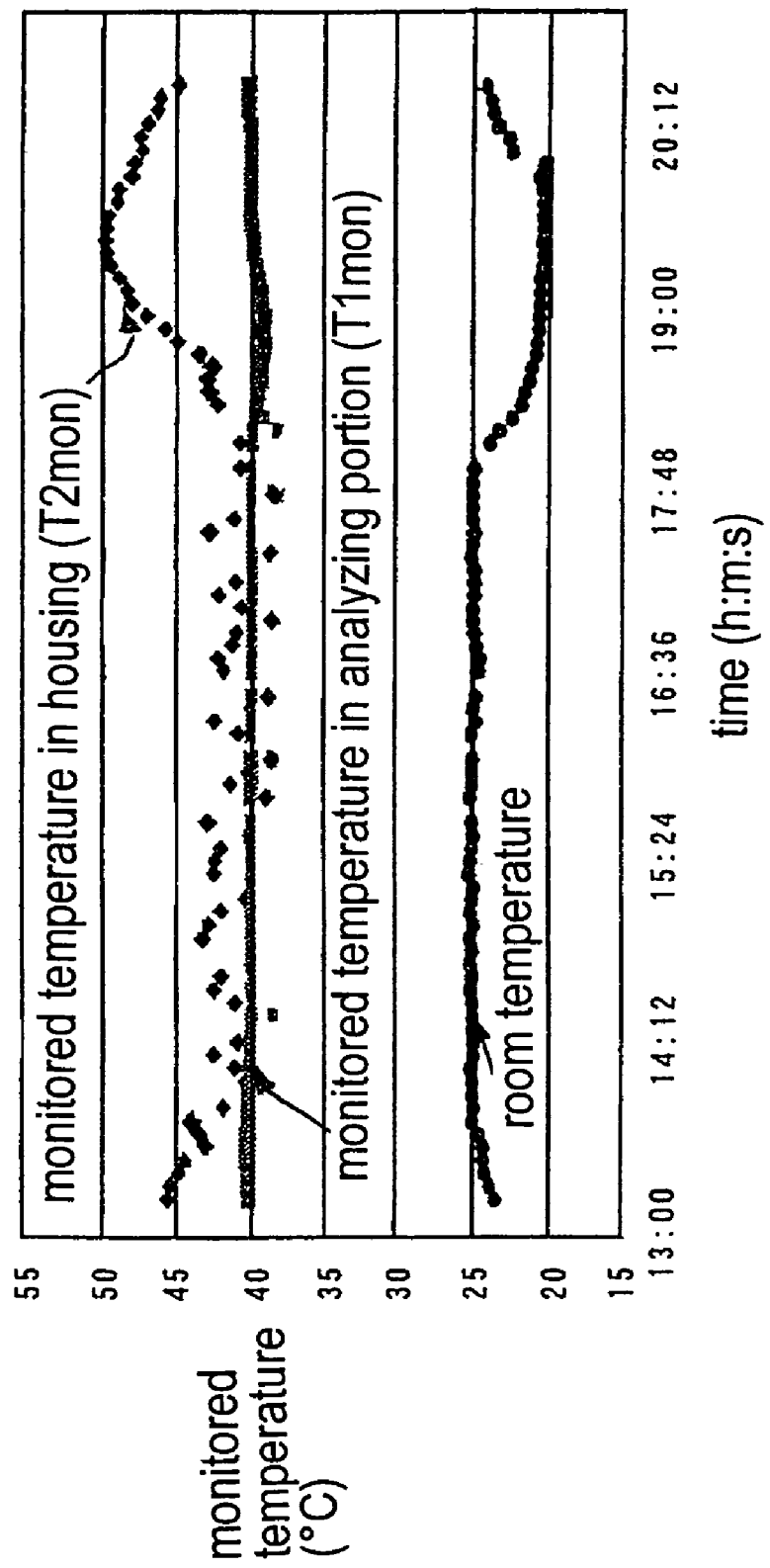
FIG. 6 is a graph showing temperature histories of a room temperature, a temperature inside the housing, and an analyzing portion temperature after an analyzing sequence is started.

After the housing inside temperature became equilibrium, an analyzing sequence was started. The histories of the room temperature, inside housing temperature monitored value T2mon and analyzing portion temperature monitored value T1mon after the start of the analyzing sequence are shown in FIG. 6. After the temperature inside the housing 30 became equilibrium, a temperature fluctuation decreased below ±0.1° C.

After the analyzing sequence was started, the room temperature was intentionally changed from 23° C. to 18° C. at the time of 18:05 to apply an external disturbance to the device. It was found that the analyzing portion temperature returned to the equilibrium state after 1.5 hours after the room temperature was changed. Accordingly, even when the temperature was changed by a large degree such as −5° C., the external disturbance was absorbed in the secondary loop, and the temperature in the flight tube at a representative point remained constant with a small variation of −0.9° C. at the maximum.

According to the present invention, it is possible to maintain the temperature in the flight tube with a small temperature variation even when the external disturbance is generated. Therefore, it is possible to maintain high measurement accuracy and repeatability of the mass spectrometry.

The disclosure of Japanese Patent Application No. 2002-334273, filed on Nov. 18, 2002, is incorporated in the application.

While the invention has been explained with reference to the specific embodiments of the invention, the explanation is illustrative and the invention is limited only by the appended claims.

What is claimed is:

1. An analytical device comprising:
 a housing,
 an analyzing portion disposed in the housing for performing an analysis,
 a heat portion situated inside the housing for heating an interior of the housing,
 a first temperature sensor attached to the analyzing portion for measuring a first temperature of the analyzing portion,
 a second temperature sensor disposed in the housing for measuring a second temperature of the interior of the housing, and
 a control portion connected to the heat portion, the first temperature sensor, and the second temperature sensor for obtaining a second setting temperature through a first PID control based on a difference between the first measured temperature and a first setting temperature in the analyzing portion, said control portion controlling an output of the heat portion through a second PID control based on a difference between the second measured temperature and the second setting temperature,
 wherein said first PID control and second PID control are performed according to a first transfer function and a second transfer function, respectively.

2. An analytical device according to claim 1, wherein said first setting temperature is a temperature of the analyzing portion set at a predetermined level in advance.

3. An analytical device according to claim 1, wherein said heat portion includes a heater and fan for controlling the temperature inside the housing.

4. An analytical device according to claim 1, wherein said analyzing portion is a time-of-flight mass spectrometer.

* * * * *